United States Patent Office 3,255,603
Patented June 14, 1966

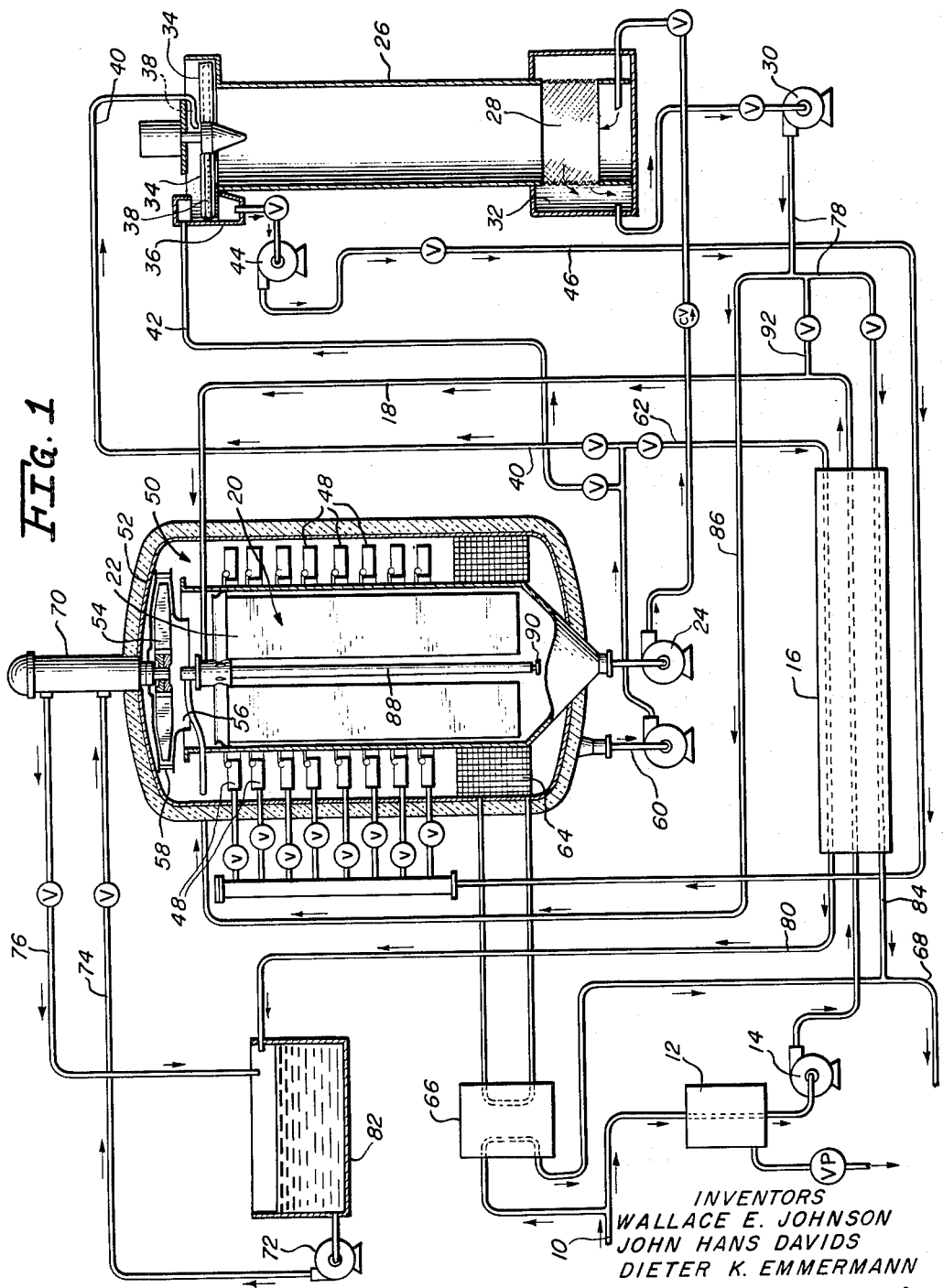

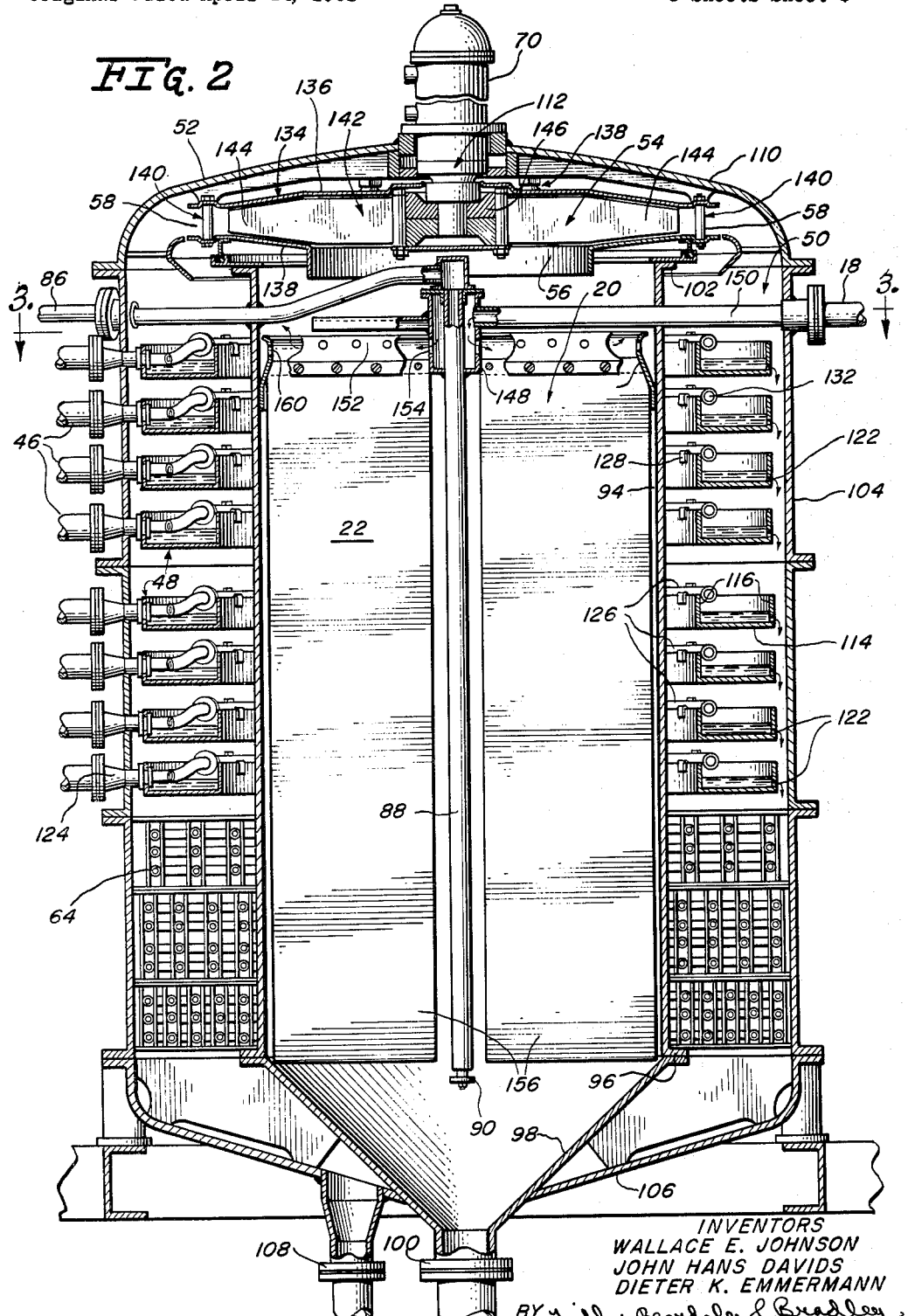

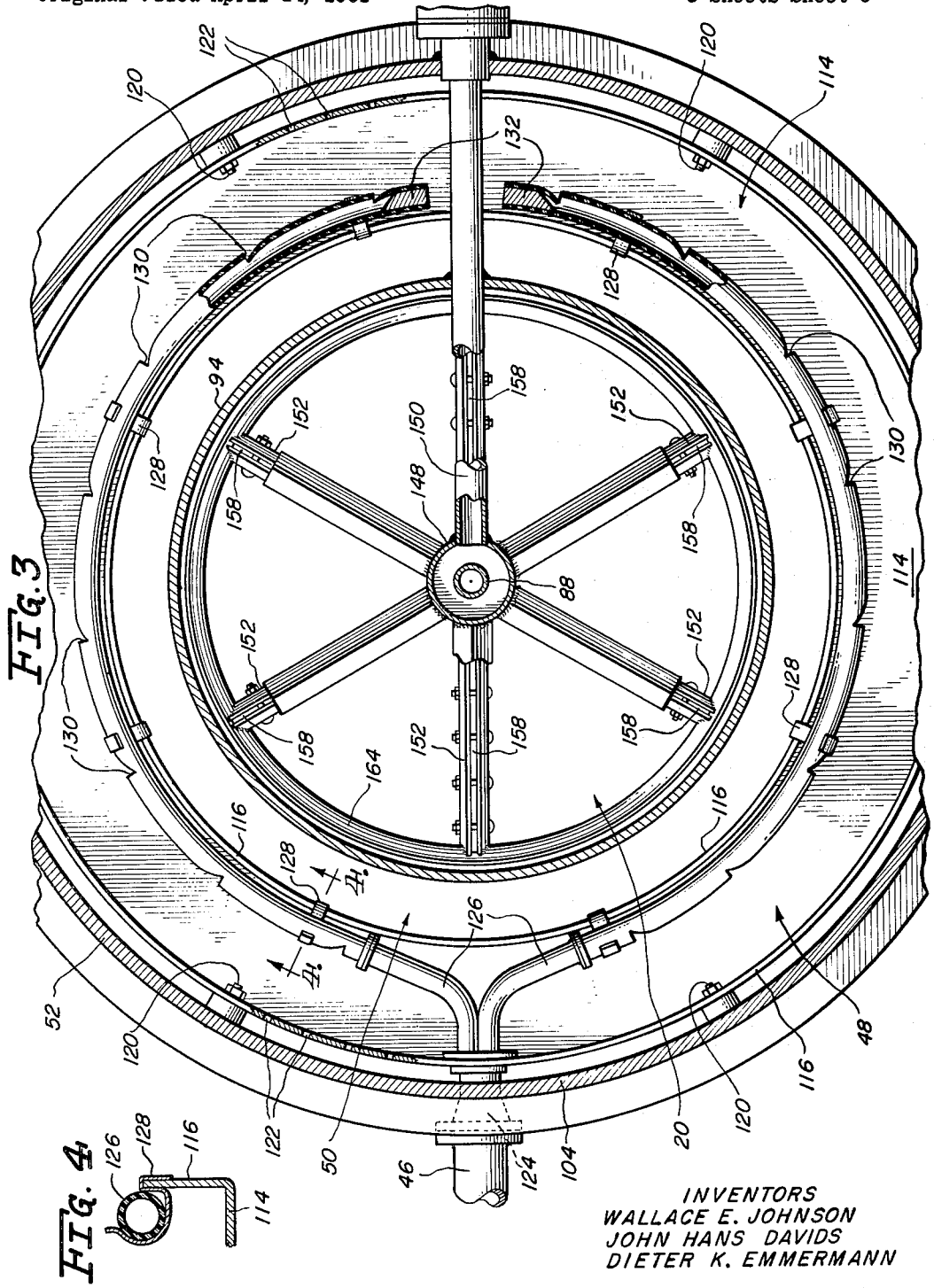

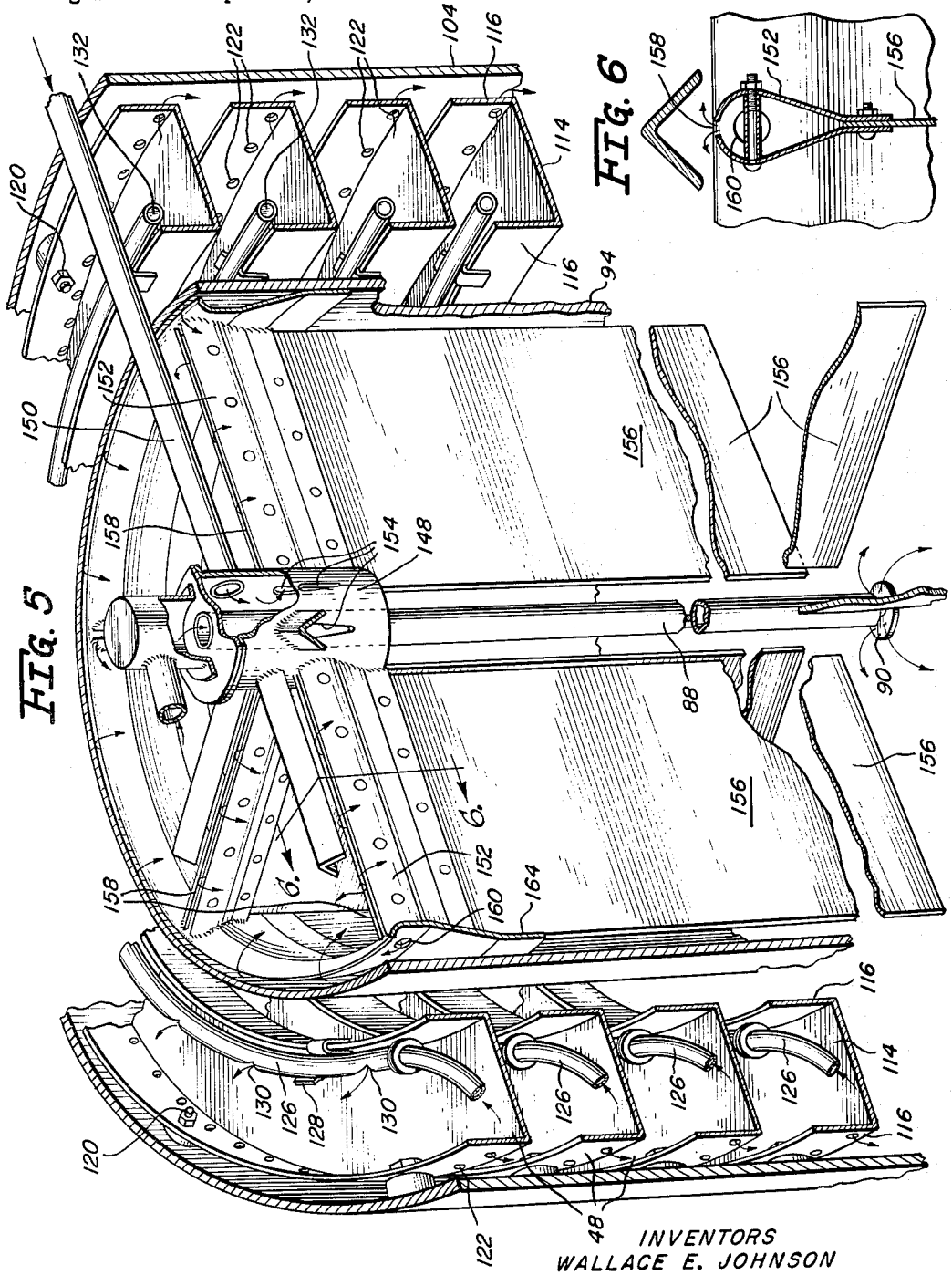

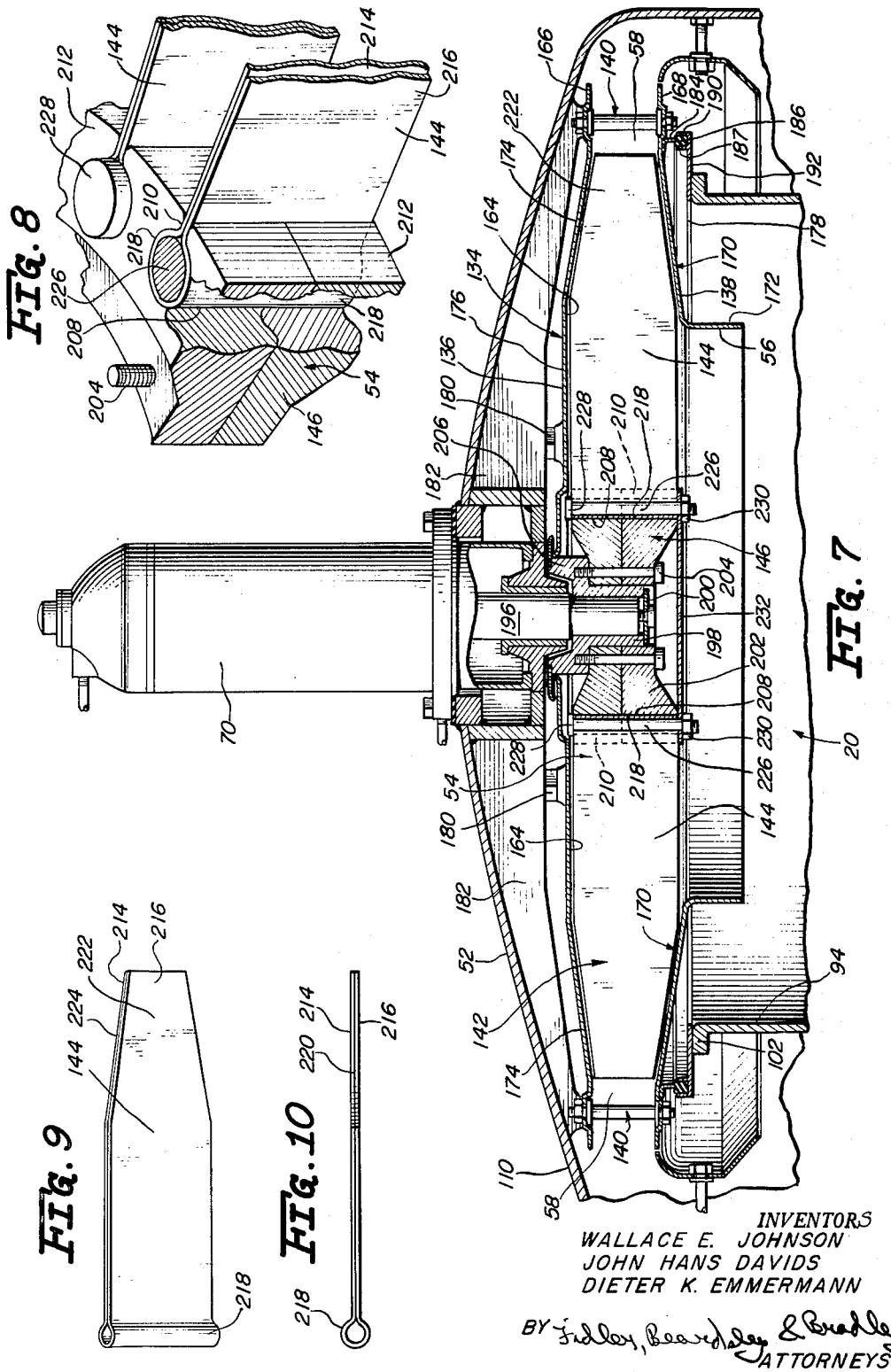

3,255,603
FREEZE CRYSTALLIZATION APPARATUS FOR SEPARATING A SOLVENT
Wallace E. Johnson, John Hans Davids, and Dieter K. Emmermann, Beloit, Wis., assignors to Desalination Plants (Developers of Zarchin Process) Limited, Tel Aviv, Israel, a limited company of Israel
Continuation of abandoned application Ser. No. 103,114, Apr. 14, 1961. This application July 21, 1964, Ser. No. 384,192
20 Claims. (Cl. 62—123)

This invention which is a continuation of application Serial No. 103,114 filed April 14, 1961, and now abandoned, relates to apparatus for separating a solute in substantially pure form from solutions and/or producing a concentration of the remaining solution. The invention more particularly relates to apparatus for producing "sweet" water from sea water, brackish ground water, industrial brines or other solutions containing water.

The apparatus of the present invention are hereinafter described in connection with their application to producing "sweet" water from sea water, but it must be appreciated that the inventions are capable of application to other fields. While in the case of producing "sweet" water from sea water the primary product is "sweet" water, in other applications of the system such as in dehydrating citrus fruit juices, the primary final product may be the concentrated remaining solution after removal of the solute, and the pure solute removed may or may not be of importance as a secondary product. Since the system hereinafter described is principally for desalting sea water, the expression "de-salination" is used hereafter in identifying the system, but it must be appreciated that this term is meant to include the various other applications of the system wherein a solute is to be separated from a solution. One of the most serious and ever-present problems in many areas of the world today is the lack of fresh water. Many of these areas have a depressed standard of living, due directly to the lack of fresh water in substantial quanties. And yet ironically enough, many of these areas are bounded by substantial bodies of sea water which, due to its salt content, is neither useful for human consumption or for irrigation.

The problem of converting sea water to potable water has long been known and the solution has been pursued by many people over many years. There have been numerous methods proposed and operated that will produce potable water from sea water and, in fact, there are several systems in operation today. These systems, however, have only enjoyed limited success because they could not produce potable water in sufficient volume and at a reasonable cost, the cost being considered from the standpoint of equipment cost, maintenance, and/or the energy input requirements for the system. Not only must a de-salination system be able to produce large volumes of potable water, but the cost is of extremely great importance. As previously pointed out, in the substandard areas of the world, this problem is most pressing and high cost of equipment, maintenance, and operation would be most severely felt in such areas.

In the past decade or more, this problem of de-salination has come under increasing attention and the basic problems have been identified. As a result of work done by others, it has been proposed that "sweet" water may be produced by a vacuum freezing system wherein precooled sea water is introduced into a vacuum evaporator. The sea water so delivered will flash-evaporate, causing the formation of pure water vapor and pure ice, which ice is carried in the remaining concentrated brine solution. In this system, the ice is separated from the brine and the ice delivered to a melting vessel. The vapor which is produced in the evaporator is also withdrawn and delivered to the melting vessel wherein it condenses on the ice. This results in the production of potable water from both condensation of the vapor and melting of the ice.

The system as above briefly described enables the recovery of the vapor as final, potable water product and even more importantly, affords a system which takes advantage of thermodynamic phenomena to provide efficient conversion of sea water to fresh water. The system eliminates to a great extent the severe problems of corrosion that occur in many other systems. In that system, the ice produced is used as a low heat sink to enable recovery of the vapor by condensation on the ice. Such a system offers a potential opportunity of developing a fully practical de-salination system. However, that system fell short of full success because the methods, systems, and apparatus used and proposed failed to result in a system that could economically and in large volume perform desalination of sea water. This prior work taught a system that in principle is sound, but no economical apparatus, method, or system for applying the principle has yet been evolved.

It cannot be over-emphasized that economy of equipment and operation cost is of the greatest concern in desalination and, while in most products economy is a factor, in the case of de-salination unless equipment costs and operation costs are economical, there is no wide-scale application possible for the system. If it is not economical, it fails.

Applicants have perfected a system of the vacuum freezing type which is practical and economical in producing potable water. Applicants have worked continuously with the "sword" of failure for high cost always poised. Every step of the method or piece of equipment must be so correlated with the system as to be economical in construction and economical and efficient in operation. As a result of this intensive work, applicants have developed the methods, systems, and apparatus for de-salination forming the subject of this application.

Broadly speaking, the methods of this application comprise the steps of delivering sea water to a vacuum evaporating chamber at temperatures necessary to produce flash-evaporation and the attendant formation of ice, vapor, and concentrated brine, separating the ice from the brine and disposing the ice in a condensing chamber contiguous to the evaporating chamber and delivering the vapor formed within the evaporating chamber into the condensing chamber along the most direct path for condensation of the vapor and melting of the ice.

Generally speaking, the apparatus for applicants' system comprises: a heat exchanger in which the sea water is precooled by passing the sea water in heat exchanging relationship with the "sweet" water final product and the concentrated brine solution being evolved from the system; an evaporating chamber maintained under vacuum and into which the sea water is delivered; a device for separating the ice from the concentrated brine and for cleansing surface salt from the ice; a condensing chamber contiguous to the evaporating chamber into which the ice is delivered; a compressor arranged within the confines of one of the chambers and communicating between the chambers for the passage of vapor as directly as possible from the evaporating chamber to the condensing chamber.

The present application, while dealing in sufficient detail with all of the various parts of the system, is primarily directed to the overall methods, systems, and apparatus, and the novel parts of the system are the subject of other co-pending applications.

Accordingly, independent objects of our invention are to provide economical and efficient methods and systems for desalination:

(a) Wherein vapor produced in the evaporating chamber is delivered in a direct and short path to the condensing chamber;

(b) Wherein vapor produced in the evaporating chamber is moved radially outward into the evaporating chamber;

(c) Wherein vapor is moved radially outward into the condensing chamber with a minimum of super-heat added thereto; or (d) Wherein the ice is distributed in a condensing chamber with substantial surface exposure for condensing the vapor.

Accordingly, further independent objects of our invention are to provide economical and efficient apparatus for de-salination:

(a) Wherein contiguous evaporating and condensing chambers are provided with direct communication therebetween through a compressor;

(b) Wherein the evaporating chamber and melting chamber are concentrically arranged;

(c) Wherein the evaporating chamber, melting chamber, and compressor are concentrically arranged;

(d) Wherein an evaporating chamber and contiguous condensing chamber are provided with a compressor communicating therebetween and housed by one of the chambers;

(e) Wherein contiguous evaporating and condensing chambers are provided and apparatus is provided for distributing the sea water within the evaporating chamber;

(f) Wherein contiguous evaporating and melting chambers are provided, and means are provided for disposing ice within the melting chamber with maximum surface exposure;

(g) Wherein the compressor is of the simplest and most economical design due to the arrangement of the condensing and evaporating chambers;

(h) Wherein ice and concentrated brine are separated and the brine on the surface of the ice crystals is washed therefrom; or (i) Wherein the arrangement of parts limits the power losses of the system.

These and other advantages will become more readily apparent as this description proceeds and is read in conjunction with the accompanying drawings in which:

FIG. 1 is a schematic layout of the de-salination system;

FIG. 2 is an elevational view in section, showing in detail the construction and arrangement of the compressor and evaporating and condensing chambers;

FIG. 3 is a plan view in section taken on lines 3—3 of FIG. 2;

FIG. 4 is a detail sectional view taken on lines 4—4 of FIG. 3;

FIG. 5 is a partial perspective view showing the evaporating chamber, the apparatus for distributing sea water in the evaporating chamber, the condensing chamber and ice distributing trays for the condensing chamber;

FIG. 6 is a detail sectional view taken on lines 6—6 of FIG. 5;

FIG. 7 is an enlarged elevational view in sections of the compressor and compressor rotor;

FIG. 8 is an enlarged detail view of the connection between the rotor and blades; and FIGS. 9 and 10 are detail views of a compressor blade.

*General description of the system*

The de-salination system of the present invention described herein is shown as applied to a system for producing potable water from sea water. The general layout of this system is best seen by referring to FIG. 1.

Sea water, which is at ambient temperature, and which has been filtered to remove floating material and other solids is brought into the system through sea water inlet pipe 10 and passes through deaerator 12 where dissolved gas is removed from the sea water. The sea water is then delivered by pump 14 to heat exchanger 16, where the incoming sea water is placed in heat-exchange relationship with the potable water final product and concentrated brine being withdrawn from the system.

The sea water entering the system will be normally at ambient temperature, such as for example 77° F. and normally contains about 3.5% by weight of salt.

As hereinafter described, the sea water leaving heat exchanger 16 will be at a temperature of approximately 30.2° F. and is delivered through pipe 18 into the evaporating chamber 20. The sea water enters the evaporating chamber at the central hub of a distributor 22 and the water thereafter flows downwardly over depending sheets on the distributor so that the incoming sea water has a large surface exposure for evaporation.

The interior of the evaporating chamber 20 is maintained at a low pressure, approximately 3.2 mm. Hg (millimeters of mercury), by a vacuum pump not shown. Due to the fact that the interior of the evaporating chamber is at such low pressure, sea water will flash-evaporate therein. At the freezing temperature of sea water, the heat of vaporization is approximately 1074 B.t.u. per pound and the heat of fusion of ice is about 144 B.t.u. per pound. As vapor is produced by evaporation, heat is removed from the remaining liquid and ice is formed therein. Due to the differences in heat of vaporization and heat of fusion, approximately 7½ pounds of ice will be produced for each pound of water vapor. The ice so produced is substantially pure water ice with no appreciable amount of salt contained therein. When continuous operation is established, the temperature within the evaporating chamber will be approximately 24.8° F. The vapor formed will be pure water vapor. Thus, upon removal of the pure water from the incoming sea water by the vaporizing and freezing, the remaining sea water becomes a more concentrated salt solution.

While theoretically in excess of 75% pure water by weight could be removed in the form of vapor and ice, we have found that removing approximately 50% by weight of pure water is in the range of greatest efficiency; thus, if approximately 50% of the water is removed as vapor and ice, the remaining brine solution will consist of approximately 7% by weight of salt.

The evaporation of water, with the consequent formation of vapor and ice, is a function of time since heat must be transferred, and also the rate of evaporation is proportional to surface area. In order to have the sea water remain in the evaporating chamber for a sufficient period of time and to offer large surface exposure of the sea water, the distributor 22 is disposed within evaporating chamber 20. This distributor is described in detail in the co-pending United States patent application of John Hans Davids, Serial Number 85,522, filed January 30, 1961, U.S. Patent No. 3,103,792 for "Means for Freezing Exposure of Salt Water in a Salt Water Purification System," which is hereby herein incorporated by reference.

The brine, with the ice crystals therein, is withdrawn from the bottom of evaporating chamber 20 through pump 24, and this mixture has a temperature of approximately 24.8° F. The mixture is delivered to separator-washer or counter-washer 26, in which the ice is separated from the concentrated brine and the ice is washed free of salt adhering to the surface of the ice crystals. The ice-brine mixture enters the lower end of the separator-washer under pressure and the column of the separator-washer becomes essentially full of ice crystals. The pressure exerted by the entrance of the brine at the bottom of the counter-washer forces the cylinder of ice packed therein upwardly, and this brine forces its way through the ice pack, out through screens 28. A pump 30 removes the brine from jacket 32 around the lower end of the counter-washer. The pressure drop, created by forcing brine through the ice pack within the column, exerts a force on the column of packed ice moving it upwardly. Thus, the ice column within the counter-washer continuously moves upwardly. At the upper end thereof is a motor-driven scraper or wiper 34 which wipes off the top of the upwardly moving column of ice and delivers the ice into trough 36. Spray heads 38 are provided at the top of counter-washer 26 for spraying "sweet" water supplied by pipe 40 onto the top of the porous column of ice, which water runs downwardly over the advancing column of ice to wash away any adhering brine on the surface or in the interstices of the ice.

"Sweet" water is added by means of pipe 42 to the ice in trough 36 so as to produce a solution of "sweet" water and ice suspended therein which can be pumped. The details of the construction and arrangement of counter-washer 26 form the subject of copending United States patent application, Serial No. 103,112, filed April 14, 1961, now abandoned by Wallace E. Johnson for "Evaporating and Condensing Chamber Apparatus," which is hereby herein incorporated by reference.

The ice is introduced into a vacuum chamber by supplying "sweet" water to the ice to provide a liquid with the ice suspended therein, the resulting material may be more readily handled, and the liquor prevents the breaking of the vacuum within the vacuum chamber. Ice-sweet water pump 44 is shown for delivering the material through pipe 46 to a plurality of trays 48 arranged concentrically within a condensing chamber 50.

Condensing chamber 50 is an annular chamber, having its inner dimension defined by the wall of the concentric evaporating chamber 20 and its outer dimension defined by the outer wall 52, which preferably is insulated as indicated in FIG. 1 to prevent heat from entering the system.

The details of construction and arrangement of evaporating chamber 20, condensing chamber 50, and trays 48 will be hereinafter described in detail and suffice it to say that the ice is distributed around trays 48 within the condensing chamber.

A radial compressor 54 is positioned within the upper end of condensing chamber 50 and has an axial intake opening 56 in communication with evaporating chamber 20 and a circular outlet 58 communicating with condensing chamber 50.

Vapor formed in evaporating chamber 20 is drawn into central inlet 56 of compressor 54 and delivered radially outward into condensing chamber 50 through outlet 58. The vapor is thus compressed and compressor 54 maintains condensing chamber 50 at a pressure of approximately 4.6 mm. Hg. The vapor delivered by the compressor into the condensing chamber passes downwardly into contact with the ice disposed in trays 48 and simultaneously causes the vapor to condense and ice to melt. The "sweet" water thus produced is withdrawn from the lower end of condensing chamber 50 through pipe 60, which delivers a portion of the "sweet" water back to counter-washer 26 through pipes 40 and 42 for ice washing and for mixing with the ice. The majority of the "sweet" water product passes through pipe 62 to heat exchanger 16.

One of the greatest difficulties encountered in prior art vacuum freezing systems is their inability to efficiently and economically handle and transport the large volumes of vapor that exist for any system producing a meaningful amount of "sweet" water, particularly when it is recognized that we are dealing with such low pressures that approximately 4,500 cubic feet of vapor at these pressures is required to provide one pound of water vapor. Without the arrangement, systems, and methods of this invention, expensive and extremely large shrouds and conduits would be required for transporting the vapor. Normally, to move any such large volume, a multi-stage axial compressor would be required and this alone without considering the conduit size and expense would make the system uneconomical.

Additionally, by positioning the compressor within one of the chambers, the pressure differential across the shrouds is so slight that a very inexpensive shrouding may be used on the compressor. In essence, the housing of the vessel into which the compressor discharges is the real structural support housing of the compressor.

Likewise, with the arrangement proposed, the compressor serves as a self-regulator upon the system since the amount of vapor that can be handled by the compressor will control the rate at which vapor is formed by vaporization and the rate at which it is condensed.

Ideally, the vapor should be delivered to the evaporating chamber at saturation conditions of pressure and temperature so that the vapor will condense on the 32° F. ice and the ice will take out of the vapor 1,074 B.t.u. per pound of vapor condensed and thereby cause the 32° F. ice to melt by each pound absorbing 144 B.t.u. However, due to losses because of heat entering the system and super-heating of the vapor, secondary refrigeration coils 64 are provided in condensing chamber 50. These coils condense enough vapor to provide thermal balance in the process. The coils 64 are cooled by a conventional refrigeration unit 66 in which sea water, tapped from sea water inlet 10, may be circulated and then discharged through waste outlet 68.

The motor 70 for driving the compressor is located outside of condensing chamber 50 so that it will not introduce heat into the system, and the drive mechanism between the motor and the compressor is of a unique type. Motor 70 is flooded with water delivered to the motor housing by pump 72 through pipe 74 and this water is circulated through the motor housing and discharged through pipe 76. The arrangement of the motor fluid connections and drive mechanism between the motor and compressor is the subject of the copending United States patent application by Gordon R. Anderson, Serial Number 93,071, filed March 3, 1961, U.S. Patent No. 3,175,372, for "Compressor Drive Means." This drive mechanism provides an effective seal for the drive shaft of the compressor, without the use of expensive and elaborate mechanical seals, which are normally required for such high pressure differentials, by allowing leakage of "sweet" water from the motor housing into the compressor. "Sweet" water flowing in the motor housing cools the motor and that portion of the "sweet" water leaking into the compressor flash-evaporates to cool the compressed vapor and partially reduce the super-heat in the vapor.

As previously described, the final product, potable water, is delivered from condensing chamber 50 through pipe 62 to the heat exchanger 16 and is at a temperature of approximately 32° F. The concentrated brine which has been separated from the ice in counter-washer 26 is delivered via pump 30 to the heat exchanger through pipe 78 and is at a temperature of approximately 24.8° F. The heat exchanger 16 is of novel construction and arrangement and forms the subject of copending United States patent application, Serial No. 230,888, filed Oct. 16, 1952, by John H. Davids and Richard F. Keyser for "Heat Exchange Assembly."

The purpose of the heat exchanger is to cool the incoming sea water to the maximum extent possible by withdrawing heat therefrom and delivering it to the cold brine and "sweet" water produced, and it is important that the sea water be cooled as efficiently as possible. Again the question of economy so dominates the desalination system that new approaches, concepts, constructions, and arrangements of the heat exchanger were required in order to meet the objective of practical, economical equipment. With heat exchanger 16, approach temperatures of about 2° F. have been achieved and, thus, sea water entering the system through cold sea water pipe 18 is at about 30.2° F.

The "sweet" water, as it leaves heat exchanger 16 through pipe 80, is the principal product of this system and is delivered to storage tank 82 from which it may be withdrawn for use. The warmed concentrated brine, as it leaves heat exchanger 16 through pipe 84, is delivered to the waste outlet 68 for return to the sea or for other use or disposal. As previously mentioned, the principal product of the system described is potable water, but of course, it will be readily appreciated that the concentrated brine could be used for further processing to produce salt or, if other raw products such as fruit juices were initially supplied to the system, the concentrated fruit juice delivered from the heat exchanger would be the principal product and the potable water would be a useful by-product.

It shall be noted that a higher pressure is necessary in the condensing chamber than in the evaporating chamber because the vapor pressure of the freezing brine is lower than the vapor pressure of the ice-water mixture at 32° F. The vapor pressure of brine of 7% by weight salinity at 24.8° F. is about 3.2 mm. Hg, while the vapor pressure of ice-water at 32° F. is about 4.6 mm. Hg. The compressor maintains this condition.

It has been found advisable to re-circulate a portion of the cold brine in order to prevent ice from building up within the evaporating chamber and thereby plugging the system and stopping continuous operation. Thus, a portion of the cold brine taken from counter-washer 26 is delivered by pump 30 into pipe 86, which connects with a tube 88 of the distributor 22, which as a spray head 90 disposed at the bottom thereof in the evaporating chamber. Likewise, a portion of the cold concentrated brine is delivered by pump 30 through brine pipe 78 and intermediate pipe 92 to incoming cold sea water pipe 18. Thus, cold concentrated brine is mixed into incoming sea water and passes through the evaporating chamber 20 over distributor 22, and this mixture is joined at the bottom of evaporating chamber 20 by sprayed-in concentrated brine from spray head 90. This introduction of concentrated brine with the sea water does not interfere adversely with the evaporation and formation of vapor and ice, but conversely does prevent ice from building up on distributor 22. In addition, small ice crystals escaping from the drainage area of the counter-washer are thus reintroduced into the system to promote crystallization. Also, the greatest amount of ice is present in the ice-brine mixture at the bottom of evaporating chamber 22 and there is a tendency for ice build-up at that point. However, the introduction of additional brine increases the fluidity of the total mixture and also has a flushing action at the bottom of the evaporating chamber.

In any commericially successful de-salination system, relatively large volumes of potable water must be produced and, while this may be effected by building larger and larger equipment, again, within shadow of commercial unacceptance due to high cost, the size of the equipment must be reasonable. With the system, schematically shown in FIG. 1, it is contemplated that approximately 60,000 gallons of potable water per 24-hour day would be produced. Rather than attempt to increase the size of the equipment and thereby add to its expense out of proportion to gain, it is contemplated that when larger production of potable water is required, which will normally be the case, separate but parallel systems will be installed and operated to supply additional requirements.

*Evaporating and condensing chamber construction*

The evaporating and condensing chambers are shown in section and elevation in FIG. 2 of the drawings and are shown in greater and more specific detail in FIGS. 3 and 5 of the drawings, to which reference is invited.

Evaporating chamber 20 comprises a cylindrical wall 94 which terminates at its lower end in an outwardly directed flange 96. Secured to flange 96 and extending downwardly therefrom is a conical drain 98 which is provided at its lower end with pipe fitting 100 for connection to the conventional piping of the system. The upper end of wall 94 also terminates in a flange 102 which the compressor 54 engages.

Disposed within chamber 20 is distributor 22 having connections through the wall of chamber 20 with brine pipe 86 and incoming sea water pipe 18. Chamber 20 is a closed chamber, except for the discharge opening at the bottom and communication with compressor at the top. A pressure of about 3.2 mm. Hg is maintained in the chamber by the compressor in conjunction with a vacuum pump not shown connected to condensing chamber 50.

The inner confines of condensing chamber 50 is provided by cylindrical wall 94 and the outer confines is defined by cylindrical wall 104. This wall 104 may be made up of a series of sections, but is a closed, air-tight vessel. Secured at the bottom of cylindrical wall 104 is a conical drain portion 106 which communicates with a pipe fitting 108, the latter affording connection to the piping of the system.

At the upper end of wall 104 is a cover member 110 secured thereto and this cover member spans the top of chambers 20 and 50. The drive mechanism between compressor motor 70 and compressor 54 extends through cover 110 and is indicated generally at 112. Condensing chamber 50 is a closed and air-tight vessel and it is maintained at a pressure of approximately 4.6 mm. Hg by a vacuum pump connected in the region of refrigeration coils 64. The only points of communication with chamber 50 are at drain portion 106, circular outlet 58 of compressor 54, connections to pipe 46 which supplies ice to trays 48, and the vacuum pump connection (not shown).

As seen in FIGS. 2, 3, and 5, a plurality of annular trays 48 are provided within condensing chamber 50. These trays are upwardly facing U-shaped channel sections having a bottom wall 114 and upwardly facing sidewalls 116. The annular trays are supported by means of studs 120 carried by cylindrical wall 104 of the condensing chamber. It will be noted that trays 48 are spaced from both cylindrical walls 94 and 104 so that vapor may pass downwardly between these walls and the sides of the trays. The outer wall 116 of each tray is provided with a series of bores 122 through which "sweet" water can drain from the trays.

As best seen in FIG. 2, each tray 48 has associated therewith a pipe connection 124, through which ice-sweet water mixture from the counter-washer is supplied to the trays. Secured at the inner end of connection 124 are two semi-circular plastic pipe sections 126 with each extending substantially half-way around the inner wall 116 of trays 48. Plastic pipes 126 are held in place on inner wall 116 of the tray by means of spring clips 128, a detail sectional view thereof being shown in FIG. 4. At spaced intervals along this length, pipes 126 are provided with notches 130, the shape of which may best be understood by referring to the right-hand side of FIG. 3. The ends of plastic pipes 126 are closed by plugs 132.

Thus, an ice-water mixture will be forced under pressure into pipes 126 through pipe connection 124 and will be distributed about perimeter of trays 48 through notches 130. Each of the notches faces against the current of flow within pipes 126 and will cause portions of the mixture to be delivered through each notch. It is important that the greatest surface area possible of the ice be exposed to the vapor since the condensing of the vapor on the ice and the heat exchange relationship that takes place between the vapor and ice is a surface phenomena. By this arrangement, the ice crystals are spread out throughout the extent of the tray 48.

The "sweet" water in the ice-water mixture will pass through discharge bores 122 in the outer wall of the trays and the water will fall downwardly into the bottom drain portion 106 of the condensing chamber. Also the potable water produced by condensation of the vapor on the ice in the trays and produced by the melting of the ice in the trays will be similarly discharged from the trays.

As previously mentioned, there are some inefficiencies in the system and some heat may enter the system. Therefore, to provide a thermal balance and allow the process to proceed on a continuous basis, heat must be removed from the system. This is accomplished by conventional refrigeration unit 66, as shown in FIG. 1, which has its cold coils 64 disposed within condensing chamber 50 at the lower end thereof, as best seen in FIG. 2. These coils are spaced apart so that vapor may pass thereover. The ice in trays 48 serves as the primary low heat sink to cause condensation of the vapor. Vapor may not be allowed to build up in the condensing chamber otherwise the system will be stalled and all of the vapor must be condensed on a continuous basis. Cold refrigeration coils 64 serve as an additional low heat sink to insure that all vapor will be condensed. Also, it is important to note here that coils 64 are located near the lower end of condensing chamber 50 so that only such vapor that has passed over the ice in trays 48 will contact these coils and be condensed thereby. Such vapor will form a layer of ice on the coils until a condition of equilibrium is established beyond which additional condensation results in the formation of water which drains from the coils. Thus, only the heat of excess vapors is removed, while the accumulation of ice on the coils acts as a reservoir to accommodate excess vapor fluctuations in the system. While the vacuum pump and its connection to condensing chamber 50 is not shown, it should be noted that the suction side of the vacuum pump is connected to chamber 50 in the zone thereof or immediately below evaporator coils 64. Thus, since coils 64 remove the excess condensable vapors, the vacuum pump functions only to remove non-condensables, i.e., air. Consequently, the required vacuum pump may be of a relatively small size and there is no necessity for a cold trap in the vacuum pump connection to chamber 20.

From the foregoing, it will be seen that the evaporating and condensing chambers are concentric chambers. This affords several advantages. Again, bearing in mind the importance of economy, this arrangement offers substantial savings in material and expense. Additionally, compactness of the equipment results and, of great importance is the thermal efficiency.

From the foregoing description, it will now be clear that an extremely compact arrangement of the evaporating and condensing chambers is possible, even though these chambers must be quite large and bulky. Since the evaporating chamber is disposed within the condensing chamber, the necessity of applying insulating material externally over the evaporating chamber is avoided entirely and the evaporating chamber is effectively insulated from external atmospheric heat by the surrounding cold condensing chamber. Evaporating chamber 20 has an ambient tempearture of approximately 24.8° F., while the ambient temperature in the condensing chamber is approximately 32° F., and this small temperature differential will greatly limit the amount of heat being transferred into the evaporating chamber. Also, since the evaporating and condensing chambers operate at a relatively low pressure difference, i.e., 3.2 vs. 4.6 mm. Hg, there is very little force exerted on evaporating chamber wall 94 and it may be of very lightweight construction and need not be of heavy costly structural material. While problems of corrosion are greatly simplified in a "vacuum-freezing" system like that of the present invention when compared to conventional systems wherein salt water is heated, it is nonetheless advisable to make the evaporating and condensing chambers of corrosion-resistant materials or materials with protective coatings to minimize corrosion problems.

*Compressor arrangement with evaporating and condensing chambers*

An important feature resulting from our invention is that vapor formed within evaporating chamber 20 may be direct and immediately moved into condensing chamber 50 without necessitating large duct work for conveying the vapor or an extremely large housing for the compressor. By the concentric arrangement of the evaporating and condensing chambers and with the positioning of the compressor as shown, many important and significant advantages, including extremely important economical advantages, have resulted.

By referring to FIG. 2, it will be seen that compressor 54 is disposed within the outer housing of the condensing-evaporating chambers. In the particular embodiment, the compressor is disposed immediately below cover 110 of chamber 50 and above cylindrical walls 94 of evaporating chamber 20. The compressor is actually supported by this cover and comprises a housing or shroud 134, having a top housing 136 and a lower housing or shroud 138, which are secured together but spaced apart around the periphery of the compressor by attachment means 140. Bottom shroud 138 is provided with the previously mentioned central inlet 56, and the annular space between the top and bottom shrouds, extending completely around the compressor, provides the circular outlet 58 previously identified. Shrouds 136 and 138 are so sealed to the walls of the chambers that the only communication between the chambers is through central inlet 56, the interior of the compressor, and circular outlet 58. Mounted within housing 134 is a rotating impeller 142 and it is important to note that this impeller is bearinged within and supported by the top cover 110 of condensing chamber 50. The housing 134 does not journal or support the impeller 142 and the housing is a lightweight shroud fully supported by cover 110, which with wall 104 is the effective support and heavy-duty housing for the compressor. As seen in the drawings, the shroud or housing 134 is of thin, light construction. Impeller 142 comprises a plurality of radially extending blades 144 and central hub 146 and is rotated by motor 70 within housing 134. It must be appreciated that in order to move the volume of vapor required, this compressor is large and rotates at a relatively high speed. For example, the diameter of impeller 142 will be approximately 7 feet and the speed of rotation will be 3,600 r.p.m. For such speed of rotation and size of impeller, it is, therefore, most important that strong and ample support be provided for the driving shaft. Since cover 110 is a substantial structural member, it is able to afford the necessary support and provide a primary housing while the actual shroud or covering for the impeller is of relatively light material. In essence, the chamber into which the compressor is discharging serves here as the housing for the compressor and support for the drive.

While the system is operating and the compressor is rotating, vapor formed within evaporating chamber 20 is drawn into central inlet 56, and is moved by rotating blades 144 radially outward at progressively increasing pressure for ultimate discharge through circular outlet 58 into condensing chamber 50. In other words, the compressor affords a direct radial path for movement of the vapor. Important also is the fact that vapor will be drawn into the compressor throughout the entire area of central inlet opening 56 and discharged throughout the entire area of circular outlet 58. Thus, vapor will be delivered around the entire annular area of condensing chamber 50 for movement into contact with the ice that has been spread out within substantially the entire area of the condensing chamber. With this concentric chamber and compressor arrangement, vapor will move from all points of discharge from the compressor in a spiral path downwardly through the condensing chamber maintaining the high velocity imparted to the vapor by the compressor. Since condensation is a function of surface contact and velocity of relative flow, this is of course advantageous. The advantages of our arrangement with regard to size and cost of equipment must be emphasized and appreciated and this close-coupled relationship of the compressor and chambers accomplishes these advantages. If a conventional volute type casing for a compressor were utilized, its diameter would be about 14 feet and to convey the volume of vapor contemplated for the type of equipment shown, ducts having diameters of approximately 6 feet would be required. Equipment of this size obviously introduces thermal losses into the system and the cost of the parts and of insulation becomes substantial.

To a large degree, vacuum freezing de-salination systems have heretofore been penalized because of the failure to provide efficient and economical equipment for and arrangements of the compressor and condensing and evaporating vessels. With the arrangements contemplated in the past to move such a large volume of vapor, one would normally use an axial compressor having several stages. The cost of such a compressor arrangement alone, and certainly when combined with the cost of providing evaporating and melting vessels, would most likely exceed the permissible cost for an entire system for de-salination.

Distributor construction

As previously mentioned, distributor 22 which is disposed within evaporating chamber 20 is described in detail in co-pending United States patent application, Serial Number 85,522, filed January 30, 1961, by John Hans Davids, for "Means for Freezing Exposure of Salt Water in a Salt Water Purification System." For purposes of the present application, its structure may be understood by referring to FIGS. 2, 3, and 5 and will now be briefly described.

The distributor comprises an upper central hollow manifold 148, which has a pipe 150 connected thereto, through which the incoming mixture of sea water and concentrated brine is supplied. Extending outwardly from manifold 148 is a series of upwardly opening conduits 152 (see FIG. 6) and incoming sea water enters these conduits through manifold ports 154. Depending therefrom are sheet-like members or plates 156, formed from suitable corrosion-resistant thin sheet stock, such as stainless steel or plastic. These plates present large surface areas. At the top of conduits 152 are elongated discharge openings or ports 158. Thus, the incoming sea water enters manifold 148, passes through manifold ports 154 into conduits 152, and overflows therefrom through elongated opening 158. Liquid thus discharged flows downwardly by gravity over plates 156 and is distributed over their large surfaces in a relatively thin film to give maximum surface exposure of the liquid in the evaporating chamber. Also, to increase surface exposure, ports 160 are provided at the ends of conduits 152 through ring support 164 so that water flows through these ports into contact with the inside of cylindrical wall 94 and flows by gravity downwardly along this wall.

It is necessary to have maximum freezing exposure of the raw liquid within the freezing region without increasing the size and cost of equipment. Also, evaporation is a function of time, as well as surface area, and the time of travel required for the sea water to flow down the entire length of sheets 156 is sufficient to allow 50% conversion to "sweet" water vapor and ice.

Compressor construction

Referring first to FIG. 7, as before indicated, the presently improved compressor generally indicated a 54 is particularly suitable for use in the aforementioned potable water producing system. Compressor 54 is mounted in the upper zone of the chamber 50 and overlies the upper end of evaporating chamber 20 with its intake port 56 open to chamber 20. The compressor discharge outlet 58, peripherally thereof, is directly open to the condensing chamber 50.

As shown by FIG. 7, the compressor 54 is an axial intake, radial discharge unit of improved and compact construction. It includes a two-part housing or casing 134 of metallic or non-metallic material, as suitable sheet metal of corrosion-resistant character or suitable plastic, fiberglass, or other similar material, comprising an upper wall-forming member or housing 136 of circular periphery, and a lower member of shroud 138, also of circular periphery and spaced from the upper member to form the rotor chamber 164 therebetween. Assembly connection of the members 136 and 138 is made by a plurality of attachment means and spacer elements 140 relatively spaced about the peripheral region of the housing in connection to the respective peripheral end portions 166 and 168 of the members. Such end portions define therebetween the compressor discharge outlet 58 which is open circumferentially of the housing. Member 138 is formed to provide a wall 170 of predetermined shallow frusto-conical form between the generally radial end portion 168 and an out-turned circular flange 172, the latter defining the axial inlet "eye" or intake port 56 of the compressor. The upper member 136 is formed to provide a similar but oppositely directed shallow frusto-conical wall section 174 inwardly from its generally radial end portion 166, merging into the inner wall section 176 which lies in a radial plane normal to the rotor axis of the compressor. Thus, in sectional view (FIG. 7), the two wall sections 170 and 174 converge toward the discharge outlet 58 from a zone which, in the present example, is slightly radially beyond the inlet flange 172. While the described frusto-conical wall section 174 is preferred in member 136, this member could be provided as a uniformly flat or planar member with corresponding increase in the angle of taper of the lower wall 138.

The compressor housing is mounted within the upper end of the device in a horizontal position over the cylindrical wall side 94 of evaporating chamber 20, wall 94 providing a circular central aperture 178 to receive the compressor inlet flange 172 therethrough. Support of the housing is effected from the top wall or cover 110 as by bolting at 180 to a plurality of tank strengthening ribs 182 depending from top wall 110. As shown in FIG. 7, the lower housing member 138 includes an external depending annular flange 184 which seats in compressive engagement with resilient seal element 186, of rubber or the like, carried in an annular channel 187 on the outer overhanging margin 190 of the end wall 192 of chamber 20. Each rib 182 terminates in a lateral projection forming a pad against which the flange 166 of the compressor housing wall 134 abuts, such pad serving to effect the desired assembly location of the wall. Due to the vacuum in the chambers, considerable load will be exerted on cover 110 to cause deflection thereof, but since compressor 54 is supported and carried thereby, no problems to the compressor result from this deflection.

Referring to FIGS. 7 to 10, operative in the housing as above described is a compressor rotor assembly or rotatable impeller 142 comprising a hub structure 146 on a vertical drive shaft 196, and a plurality of generally radial blades 144 projecting from the hub. The hub structure comprises a shaft-mounting sleeve hub 198 keyed to, pressed on, or otherwise fixed to drive shaft 196 and held thereon as by a retainer plate 200 bolted to the shaft, and a blade hub 202 here constructed in mating halves, secured as by bolts 204 to the flange portion 206 of shaft hub 198. Formed in the hub 202 are a plurality of circular through bores 208 parallel to the shaft axis, these being inwardly adjacent to the hub periphery and equi-angularly spaced circumferentially of the hub. Each bore 208 has a radial slot 210 of predetermined width, opening the bore to the hub periphery, the slots as well as the bores being open at each side face 212 of the hub. The bores and slots form blade mounting seats.

Each blade 144 is formed from a strip of sheet material having a predetermined thickness. The blade material here used is corrosion-resistant metal, as stainless steel. In blade formation, an elongate rectangular strip of predetermined length and width is lengthwise reversely turned or folded upon itself, folding being about a round bar or arbor (not shown) at the strip center, to provide a blade of two-ply or double thickness character having the blade plies 214 and 216 and a hollow circular enlarged or eye portion 218 at one end. The blade plies are suitably secured together in flat engagement over the lengths thereof, as by a suitable adhesive or cementitious material preferably in a layer 220 between the plies. The blade over its outer end section 222 is marginally cut or reduced to provide converging blade margins 224 such that the blade will have a running clearance in the converging zone of the compressor housing formed by the wall portions 170 and 174, FIG. 7.

In blade assembly to the hub 202, each blade has its enlarged or eye end 218 inserted and seated in one of the hub bores 208 with the blade projecting outwardly therefrom through the associated bore slot 210. The outer diameter of blade eye 218 is such as to effect a snug fit thereof in the bore, while the width of the bore slot 210 is such as to closely confine the blade portion extending therethrough. In final assembly, each blade is retained against lateral displacement from its bore seat, by suitable means as a headed bolt extending through the blade eye 218, with the bolt head 228 against one side face 212 of the hub, and a nut 230 at the opposite or threaded end of the bolt engaging against a hub closure plate 232 abutting the opposite hub side 212.

The blades 144 thus mounted on hub 202 extend therefrom in the compressor housing rotor chamber 164 with the reduced or convergently tapered end portions 222 thereof in close running fit in the converging zone of the housing provided by walls 170 and 174. These rotor blades being constructed of thin sheet strips in the manner described, afford lightweight flexible blades which, mounted as shown and described, permit high-speed operation of the rotor. The two-ply blades have a predetermined minimum thickness, as for example approximately two hundredths of an inch (.02″) in a blade having a length of about thirty-one (31) inches and a width of about nine (9) inches inwardly of its tapered end. This minimum thickness is sufficient for structural self-support of the blades in displacing water vapor under the heretofore indicated sub-atmospheric pressures, as the blades, being flexible, will assume positions of radial extension from the hub under the influence of centrifugal forces thereon in compressor operation. Thus, the improved rotor structure is one which may be economically constructed with easy to fabricate blades and a simple yet highly effective blade-mounting arrangement. The thin blades of stainless steel, formed in the manner described, facilitate desired high-speed rotation of the rotor and such high-speed operation is further facilitated by the absence of rotating blade shrouds.

The compressor as herein illustrated and now described, is designed and fully effective for handling water vapor in large volume and at a relatively low compression ratio, under the described sub-atmospheric pressure conditions. In this construction, the opening size or diameter of the compressor inlet "eye" 56 is determined in accordance with the desired velocity of vapor intake and flow rate in the compressor. As illustrated in the present example, the inlet is of relatively large diameter and open to the blades over approximately the inner half-lengths thereof. Also, since the degree of vapor compression is dependent on rotor speed and the outer diameter of the rotor blading, these factors are selected here to attain the desired compression ratio suitable to the purpose of the system referred to.

It is to be noted that the straight peripheral portions or margins 166 and 168 of the compressor housing, defining the compressor outlet 58 which is open circumferentially of the compressor, form a diffuser wherein the dynamic energy of the discharged vapor is converted to static pressure. Such diffuser may be extended to form a continuation of compressor housing wall member 138 and, cooperating with the adjacent top portion 110, provides a downwardly directed annular outlet into condensing chamber 50.

From the foregoing, it will be seen that the compressor and compressor rotor is of extremely simple and efficient construction and yet of economical construction. The rotor assembly has blades of thin sheet material in a flexible mounting on a central hub and can handle large volumes of vapor at a relatively low compression ratio under the given sub-atmospheric pressure conditions with the blades assuming operative positions responsive to centrifugal force.

Summary of operation

Sea water, from which potable water is to be produced, enters inlet pipe 10, is deaerated in device 12, passes through heat exchanger 16 where its temperature is reduced to approximately 30.4° F., is flowed over distributor 22 in the evaporating chamber 20 for flash-evaporation in this vacuum chamber. This evaporation separates pure water from the sea water in the form of vapor and ice crystals. The ice crystals flow with the progressively concentrated brine through the lower end of the evaporation chamber and this mixture is delivered into the counter-washer 26, wherein the ice crystals are separated from the brine, are washed free of adhering brine, and are mixed with "sweet" water. This mixture is then pumped into distributing trays 48 within condensing chamber 50, and the ice distributed throughout the area of the trays.

Vapor formed in evaporating chamber 20 is pulled into central inlet 56 of compressor 54, has its pressure increased, is delivered outwardly through circular outlet 58, and travels spirally downward within condensing chamber 50 to contact the pure ice crystals. This causes condensation of the vapor and melting of the ice due to heat exchange therebetween and, with the aid of secondary refrigeration, this continuously produces potable water in the bottom of the condensing chamber, which water is then passed in heat exchange relationship with the incoming sea water to a storage tank. The concentrated brine from the counter-washer is also passed in heat exchange relationship with the incoming sea water for discharge from the system.

The methods, systems, and apparatus of this invention allow production of potable water having less than 500 parts per million of salt at an economical cost, when considering both the capital investment and operating expense.

As previously mentioned, this application has described a preferred embodiment of the invention which embodiment is a system for producing potable or pure water from sea water, but the invention has uses in other fields and for other purposes, and various changes and substitutions may be made in the particular method steps, systems, arrangements, or apparatus without departing from the scope of our invention as defined in the following claims.

We claim:

1. In freezing apparatus for separating a solvent from a solution, an evaporating chamber, means for introducing the solution into said evaporating chamber, a condensing chamber, a compressor for moving vapor between said chambers, said chambers and compressor being contiguous and coaxial on a common axis including the axis of rotation of the shaft of the compressor, the major axis of the mean flow path of vapor into said compressor from said evaporating chamber and the major axis of the mean flow path of vapor from said compressor into said condensing chamber, means to maintain said evaporating chamber at subatmospheric pressure, said evaporating chamber having vapor and ice formed therein, a separator for separating said ice from the solution, means to deliver ice to said condensing chamber for condensation of said vapor on said ice to produce solvent, and a heat exchanger wherein said solution is precooled.

2. The apparatus of claim 1 including means to maintain said evaporating chamber at low temperature and wherein said solution evaporates in said evaporating chamber producing vapor of the solvent, said vapor being moved by said compressor from said evaporating chamber to said condensing chamber, and said vapor of said solvent condenses on said ice in said condensing chamber.

3. The apparatus of claim 2 wherein said chambers are arranged, one within the other.

4. The apparatus of claim 2 wherein said compressor includes a rotor having a central hub provided with bores, and radially extending blades of thin sheet material received in said bores, said blades being formed of a length of said sheet material turned upon itself to form said blades.

5. The apparatus of claim 1 including means for delivering ice to said condensing chamber for condensation of said vapor on the solvent film on said ice to produce solvent.

6. The apparatus of claim 1 wherein sweet water is the solvent and salt water is the solution, said salt water evaporates in said evaporating chamber to produce sweet water and ice of sweet water, and said vapor condenses on said ice in said condensing chamber to produce sweet water liquid.

7. The apparatus of claim 1 wherein said chambers are arranged, one within the other.

8. The apparatus of claim 1 wherein said chambers are tanks, one within the other, and said outer chamber is a chamber formed between the walls of said tanks.

9. The apparatus of claim 1 wherein said evaporating chamber is disposed within said condensing chamber.

10. The apparatus of claim 1 including a distributor member for increasing surface exposure of the solution introduced into said evaporating chamber and a distributor member for increasing surface exposure of the ice to the vapor in said condensing chamber.

11. The apparatus of claim 1 wherein said compressor is disposed within one of said chambers.

12. The apparatus of claim 1 wherein said compressor is a radial compressor and has a vapor inlet communicating with said evaporating chamber and a vapor outlet communicating with said condensing chamber.

13. The apparatus of claim 1 wherein a drive motor for the compressor is mounted externally of and supported by one of said chambers and a shaft extends into the chamber in driving engagement with said compressor.

14. The apparatus of claim 1 wherein vapor is discharged from said compressor throughout the cross-sectional area of said condensing chamber.

15. The apparatus of claim 1 wherein said compressor includes a rotor having a central hub and radially extending blades of thin sheet material.

16. The apparatus of claim 15 formed from a length of sheet material wherein said blades are turned upon itself to form the blades.

17. The apparatus of claim 16 wherein bores are provided in said hub, and said blades are received in said bores.

18. The apparatus of claim 16 wherein the blades have a circular eye portion disposed within said bores and cylindrical elements secure said blades through the eye portion to said hub.

19. The apparatus of claim 18 wherein the blades have a circular eye portion disposed within said bores and cylindrical elements secure said blades through the eye portion to said hub.

20. In freezing apparatus for separating a solvent from a solution, an evaporating chamber, means for introducing the solution into said evaporating chamber, a condensing chamber, a compressor for moving vapor between said chambers, said chambers and compressor being contiguous and coaxial on a common axis including the axis of rotation of the shaft of the compressor, the major axis of the mean flow path of vapor into said compressor from said evaporating chamber and the major axis of the mean flow path of vapor from said compressor into said condensing chamber, means to maintain said evaporating chamber at a pressure sufficient to permit vapor to form in the evaporating chamber, said evaporating chamber having vapor and ice formed therein, a separator for separating said ice from the solution, means for delivering said vapor to the condensing chamber for removal of heat from the vapor in the condensing chamber by transfer of said heat to said ice to condense the vapor and to melt said ice, and a heat exchanger wherein said solution is precooled.

References Cited by the Examiner

UNITED STATES PATENTS

| 3,049,889 | 8/1962 | Carfagno | 62—58 |
| 3,136,707 | 6/1964 | Hickman | 202—236 |

FOREIGN PATENTS

| 233,675 | 4/1961 | Australia. |
| 985,905 | 3/1951 | France. |

OTHER REFERENCES

Carrier Publication: "Development of a Direct-Freezing Continuous Wash-Separation Process for Saline Water Conversion," Office of Saline Water Report No. 23, Department of the Interior. Pages 1–3 and Figures 1 and 2 (January 1959).

NORMAN YUDKOFF, *Primary Examiner.*